(12) United States Patent
Hellenbrand

(10) Patent No.: US 9,688,471 B2
(45) Date of Patent: Jun. 27, 2017

(54) PHARMACY PICKING DEVICE COMPRISING A UNIVERSAL SUPPLY-AND-CONTROL MODULE

(71) Applicant: CareFusion Germany 326 GmbH, Kelberg (DE)

(72) Inventor: Christoph Hellenbrand, Kaifenheim (DE)

(73) Assignee: CAREFUSION GERMANY 326 GMBH, Kelberg (DE)

(*) Notice: Subject to any disclaimer, the term of this patent is extended or adjusted under 35 U.S.C. 154(b) by 0 days.

(21) Appl. No.: 15/164,836

(22) Filed: May 25, 2016

(65) Prior Publication Data
US 2016/0272425 A1    Sep. 22, 2016

Related U.S. Application Data

(63) Continuation of application No. 14/348,582, filed as application No. PCT/EP2012/066086 on Aug. 17, 2012, now Pat. No. 9,359,136.

(30) Foreign Application Priority Data

Sep. 30, 2011  (EP) .................................... 11183529

(51) Int. Cl.
*B65G 49/00*    (2006.01)
*B65G 1/137*    (2006.01)
(Continued)

(52) U.S. Cl.
CPC ............ *B65G 1/137* (2013.01); *A47F 3/0478* (2013.01); *B65G 1/0407* (2013.01);
(Continued)

(58) Field of Classification Search
CPC . A47F 1/04; A47F 3/02; A47F 3/0478; B65G 1/137; B65G 1/1373; B65G 1/1378;
(Continued)

(56) References Cited

U.S. PATENT DOCUMENTS

RE35,743 E * 3/1998 Pearson ............... A61G 12/001
                                                        221/123
6,356,801 B1    3/2002 Goodman et al.
(Continued)

FOREIGN PATENT DOCUMENTS

| DE | 102008027646 A1 | 12/2009 |
| EP | 1524209 A1 | 4/2005 |
| EP | 1852351 A1 | 11/2007 |

OTHER PUBLICATIONS

English translation of the International Preliminary Report on Patentability for Application No. PCT/EP2012/066086, dated Mar. 31, 2014 6 pages.
International Search Report for Application No. PCT/EP2012/066086, dated Sep. 14, 2012, 2 pages.

*Primary Examiner* — Mark Beauchaine
(74) *Attorney, Agent, or Firm* — McDermott Will & Emery LLP

(57) ABSTRACT

The invention relates to a pharmacy picking device (I) comprising a housing (10) with a plurality of shelf bases (II) disposed one above the other, at least one operating device (12), a conveyor device (14), a housing-coupling interface (15), and a universal supply-and-control module (20) This universal supply-and-control module (20) comprises a feed device (21), an identification and measurement device (22), operator input/output devices (23), an electronic controller (24) and a voltage supply assembly (25), as well as a housing-coupling interface (15) and an electrical interface (27), said supply-and-control module (20) being arranged adjacent to the housing (10) such that a mechanical coupling is produced by said housing-coupling interface (15) and module-coupling interface (26), in such a manner that drug packages in or on the supply-and-control module (20),
(Continued)

Figure 1A:
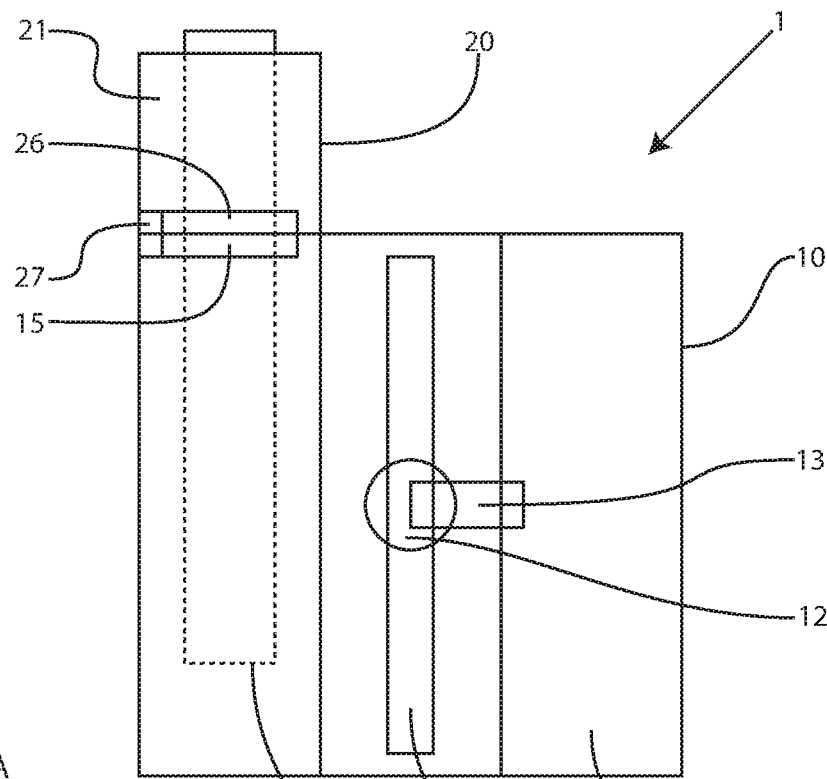

which are to be deposited, are delivered to a position on the conveyor device (14) which is known to the electronic controller.

20 Claims, 3 Drawing Sheets

(51) Int. Cl.
  *A47F 3/04* (2006.01)
  *B65G 1/04* (2006.01)
(52) U.S. Cl.
  CPC ........... *B65G 1/1378* (2013.01); *B65G 49/00* (2013.01); *B65G 2207/30* (2013.01)
(58) Field of Classification Search
  CPC .. B65G 49/00; B65G 1/0407; B65G 2207/30; G06F 1/16
  See application file for complete search history.

(56) References Cited

U.S. PATENT DOCUMENTS

| | | | |
|---|---|---|---|
| 8,281,553 B2* | 10/2012 | Kim | G07F 11/165 221/13 |
| 2002/0125265 A1 | 9/2002 | Burggraf | |
| 2007/0274036 A1* | 11/2007 | Walsh | H05K 5/0213 361/688 |
| 2008/0262649 A1* | 10/2008 | Allinson | G06F 19/3462 700/235 |
| 2010/0155471 A1 | 6/2010 | Heinz et al. | |
| 2011/0017764 A1* | 1/2011 | Liguori | G07F 11/165 221/1 |
| 2011/0184751 A1* | 7/2011 | Holmes | G06F 19/3462 705/2 |
| 2012/0012606 A1* | 1/2012 | Longley | G07F 11/58 221/92 |

* cited by examiner

PHARMACY PICKING DEVICE COMPRISING A UNIVERSAL SUPPLY-AND-CONTROL MODULE

CROSS-REFERENCE TO RELATED APPLICATIONS

The present application claims the benefit of priority under 35 U.S.C. §120 as a continuation of U.S. patent application Ser. No. 14/348,582 entitled "Pharmacy Picking Device Comprising a Universal Supply-and-Control Module," filed on Jul. 9, 2014, the disclosure of which is hereby incorporated by reference in its entirety for all purposes.

U.S. patent application Ser. No. 14/348,582 is a national stage entry of International Patent Application Serial No. PCT/EP2012/066086, filed on Aug. 17, 2012, the disclosure of which is hereby incorporated by reference in its entirety for all purposes.

International Patent Application Serial No. PCT/EP2012/066086 claims priority to and benefit of European Patent Application Serial No. 11183529.4, filed on Sep. 30, 2011, the disclosure of which is hereby incorporated by reference in its entirety for all purposes.

DESCRIPTION

The present invention relates to a pharmacy order picking apparatus, and, in particular, to a pharmacy order picking apparatus having a universal supply and control module.

The installation or setup of modern pharmacy order picking apparatuses generally requires three working days. As soon as the order picking apparatus has been completely set up, startup takes place, followed by calibration of the storage locations and filling. Two further days are required for this purpose, and a time span for equipping the apparatus can be extended if a large order picking apparatus is being installed in a pharmacy. The usual operation of the pharmacy is therefore disrupted for at least five days.

It is the task of the present invention to make available a pharmacy order picking apparatus that can be set up and equipped in a pharmacy within a shorter time span and thereby in clearly most cost-advantageous manner than order picking apparatuses that are usual today.

This task is accomplished, according to the invention, by a pharmacy order picking apparatus having the characteristics of claim 1.

The pharmacy order picking apparatus according to the invention comprises two essential components, namely a housing and a universal supply and control module, where the supply and control module according to the present invention can be used with numerous housing variants. The housing itself comprises a plurality of shelf boards disposed one on top of the other, and at least one operating device that can be moved horizontally and vertically in front of the shelf boards, on a guide, having a gripping apparatus for storing and/or removing medication packages on or from the shelf boards, where the operating device can access medication packages situated in a working region. The housing furthermore comprises a conveying apparatus for transporting medication packages to be stored, where this conveying apparatus extends at least in part into the working region of the operating device, so that the latter can pick up medication packages from the conveying apparatus and convey them onto a predetermined shelf board. The conveying apparatus borders on a housing coupling interface at a predetermined position, which interface is disposed on an outer wall or within a recess of the housing, where of course even those conveying apparatuses that extend outward through the housing coupling interface border on the housing coupling interface.

The pharmacy order picking apparatus according to the invention furthermore comprises a universal supply and control module having a number of assemblies, namely a feed apparatus for medication packages to be put in storage, an identification and measurement apparatus for identifying and measuring medication packages to be put in storage, operator input/output devices for input and reproduction of data and instructions by and to an operator, control electronics that control the assemblies disposed in the supply and control module, a voltage supply assembly for all the electrical assemblies of the supply and control module, a mechanical module coupling interface complementary to the housing coupling interface, and at least one electrical interface for coupling all the electrical assemblies disposed within the housing, where this coupling is carried out in such a manner that the voltage supply of the electrical assemblies disposed in the housing is made available by the voltage supply assembly of the supply and control module.

The aforementioned assemblies can be installed separately in the supply and control module, but it is also possible that multiple assemblies or apparatuses are combined with one another, where it is ensured, however, that the respective functions of the individual assemblies/apparatuses can be implemented. Thus, it is possible, for example, that the identification and measurement apparatus is combined in a collective assembly with the feed apparatus, where this assembly then makes the functions of the individual assemblies available.

Furthermore, it is also possible that parts of assemblies of the housing are integrated into assemblies of the supply and control module (an example of this follows below). Therefore, if assemblies or apparatuses are mentioned within the scope of this application, this is not meant to imply that these are all structured separately.

The at least one electrical interface comprises an interface for the operating device, with which the control electronics are coupled in such a manner that the control electronics can transmit control signals to the operating device.

The supply and control module is disposed adjacent to the housing, in such a manner that mechanical coupling between the housing and the supply and control module is produced by way of the housing coupling interface and the module coupling interface, so that medication packages to be put in storage are transferred to the conveying apparatus in or on the supply and control module, at a position known to the control electronics.

In the pharmacy order picking apparatus according to the invention, a major portion of the electrical assemblies is disposed in the supply and control module, and these assemblies, which are essential for proper operation of the order picking apparatus, can already be connected in the factory and synchronized with one another and calibrated. It is no longer necessary to connect the different electrical assemblies with one another and calibrate them on site, during installation of the order picking apparatus.

During the setup or installation of an order picking apparatus according to the invention, first the housing, which makes the actual storage location for the medication packages available, by way of the multiple shelf boards, is set up. The housing and the related shelf boards themselves can be set up very rapidly, because this is a rather simple design. Only the operating device that can be moved on a guide requires a connection with the central control electronics of the order picking apparatus.

As soon as the housing has been set up, the supply and control module is disposed at the housing coupling interface, and mechanical coupling between the housing and the supply and control module is produced by way of the module coupling interface. Furthermore, an electrical breakthrough between the operating device and the control electronics is produced by way of the at least one electrical interface (in other words also between the housing and the supply and control module), so that the control electronics can transmit control signals to the operating device. In the order picking apparatus according to the invention, only one mechanical and one electrical connection therefore have to be produced; all the other error-prone electrical connections were already produced before the start of setup of the order picking apparatus, namely during production of the supply and control module. The setup time is significantly reduced by this, because the work for electrical connection and coupling of different assemblies no longer needs to be performed on site, but rather is already performed at the manufacturer's location, during production of the supply and control module.

The universal supply and control module should be disposed at the housing coupling interface with its module coupling interface. The coupling interface of the housing can be disposed on any desired outside wall; the precise placement of the coupling interface in the housing itself is primarily determined by the spatial conditions in a pharmacy. If the aforementioned spatial conditions permit, it is preferred that the housing has a recess (for example at a corner, if the housing itself is structured to be rectangular), in which the universal supply and control module is disposed. In this method of placement of the supply and control module in a recess of the housing, it is furthermore preferred that the front of the universal supply and control module ends with the front of the housing.

Storage of the medication packages takes place on a plurality of shelf boards, disposed one on top of the other, in front of which an operating device having a gripping apparatus can be moved horizontally and vertically. To increase the accommodation capacity of the order picking apparatus, it is preferred that the plurality of shelf boards disposed one on top of the other form two shelf rows, between which an alleyway is defined, in which the guide of the operating device is disposed in such a manner that the operating device having the gripping apparatus can access the shelf boards of both shelf rows. In such a case, the gripping apparatus, as such, can be rotated about the vertical axis, for example, or can have movable gripping jaws that can be moved into the shelf boards on both sides of the alleyway.

Because of the great storage capacity, it can be practical, particularly in the case of such a configuration of the order picking apparatus, to use a plurality of operating devices. The use of the term "shelf rows" is not supposed to imply that these must run parallel to one another. If the spatial conditions require, the "rows" can also be curved; in such a case, the guide of the operating device(s) must be adapted accordingly.

The operating device is displaceable along the guide (x direction), for one thing. Furthermore, at least the gripping apparatus of the operating device is displaceable in terms of height (y direction). The drive for the movement of the gripping apparatus in the y direction is disposed on the operating device itself. The drive unit for the movement of the operating device along the guide can be disposed on the operating device itself, for one thing. In this case, the operating device is displaced together with the drive unit, on a fixed guide. To reduce the cables required between the operating device and the control electronics of the order picking apparatus, however, it is preferred that the drive unit for the movement of the operating device is disposed in the universal supply and control module. This drive unit is then coupled with the operating device, for example by way of a belt drive, and moves the operating device in the x direction, along the guide. Such an arrangement furthermore has the advantage that in the event of a malfunction of the drive unit for the movement in the x direction, the drive unit itself is easier to reach and to replace, if necessary. Furthermore, it is advantageous that the heat produced by the drive unit is not dissipated directly into the storage space of the medication packages. To avoid complicated coupling between drive unit and operating device, it is preferred that at least a part of the drive unit is introduced into the housing, by way of an opening in the latter, after installation of the supply and control module, so that a drive belt, for example, can be easily coupled.

The feed apparatus of the supply and control module serves for placement of the medication packages in storage, where the feed apparatus is the location of the order picking apparatus at which the operator supplies the medication packages to the apparatus himself.

A single package or a plurality of medication packages is placed into or onto the feed apparatus by an operator.

It is particularly preferred that a section of the conveying apparatus of the housing is passed out of the housing at the housing coupling interface, and projects into the universal supply and control module by way of the module coupling interface, and in this connection, mechanical coupling between the housing and the supply and control module is produced. In such a case, the medication packages in the supply and control module are transferred to the conveying apparatus at a position known to the control electronics. This has the advantage that only one conveying apparatus is provided in the order picking apparatus, and thereby the additional construction effort for a second conveying device in the supply and control module is eliminated. In this case, a section of the conveying apparatus makes a part of the feed apparatus available (see above).

However, it can become necessary, for structural reasons, for example, that a conveying apparatus is also provided in the supply and control module, which then is part of the feed apparatus. The packages are then placed by the operator onto the conveying apparatus of the supply and control module, and are transferred from the conveying apparatus in the module to the conveying apparatus of the housing, in the region of the transition between housing coupling interface/module coupling interface.

The feed apparatus can also comprise a drawer system into which medication packages are placed by a user. This drawer system can be structured in such a manner that it is passed into the housing at the transition between housing coupling interface/module coupling interface, and, in the housing, is passed into the working region of the operating device. Although this has disadvantages with regard to the operability of the order picking apparatus, the costs are correspondingly lower, because the medication packages are essentially introduced into the housing by hand (where they are then taken up by the operating device). In this case, the conveying apparatus is made available by a component of the feed apparatus.

In a preferred exemplary embodiment, the conveying apparatus comprises an endless conveyor belt onto which the medication packages are transferred. Such an endless conveyor belt is cost-advantageous and can be quickly replaced in the event of damage. This endless belt can extend all the way into the supply and control module (see above Because of the concentration of the electrical assemblies in the supply and control module, the heat development is restricted to a small space. To avoid an overly high temperature in the supply and control module, the universal supply and control module preferably comprises a ventilation apparatus having an air intake device, air guides, and air exits. The air guides are preferably configured in such a manner that no air enters into the housing, in order to thereby prevent the storage region for the medication packages from heating up. It is practical if the air intake device is disposed in the bottom region, and the air exits are disposed in the upper region of the supply and control module.

Figure 1B:
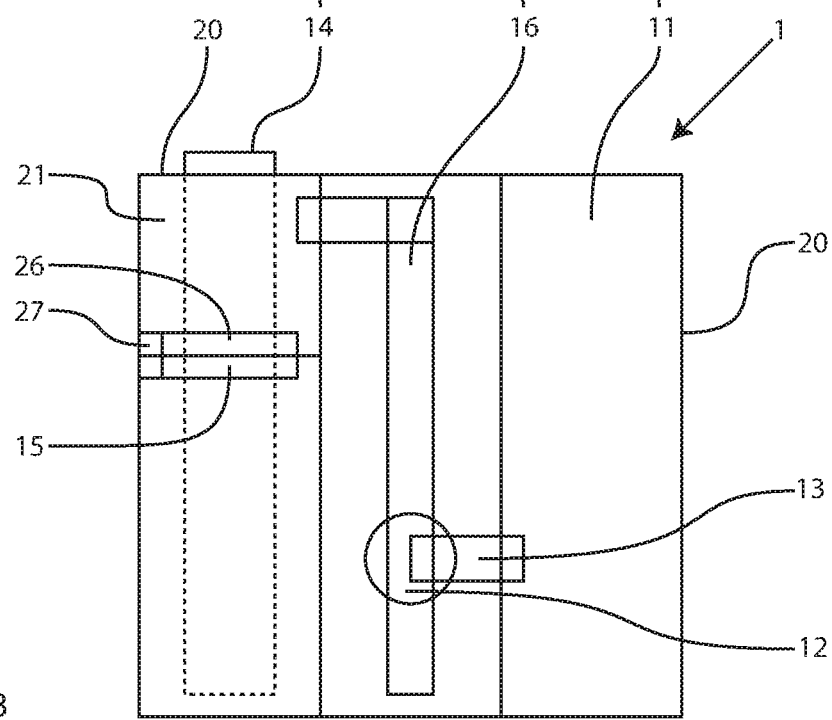
Figure 2:
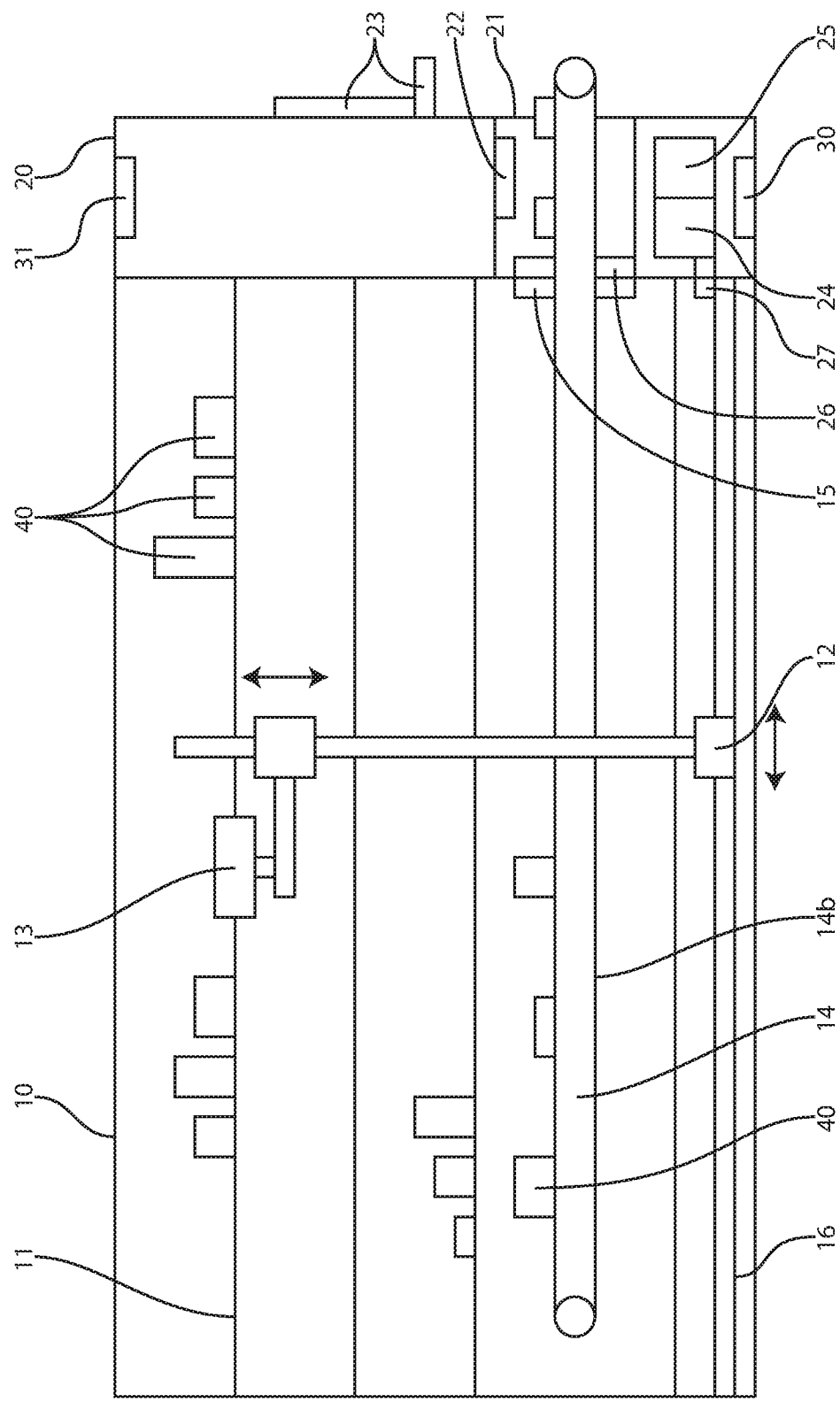
Figure 3:
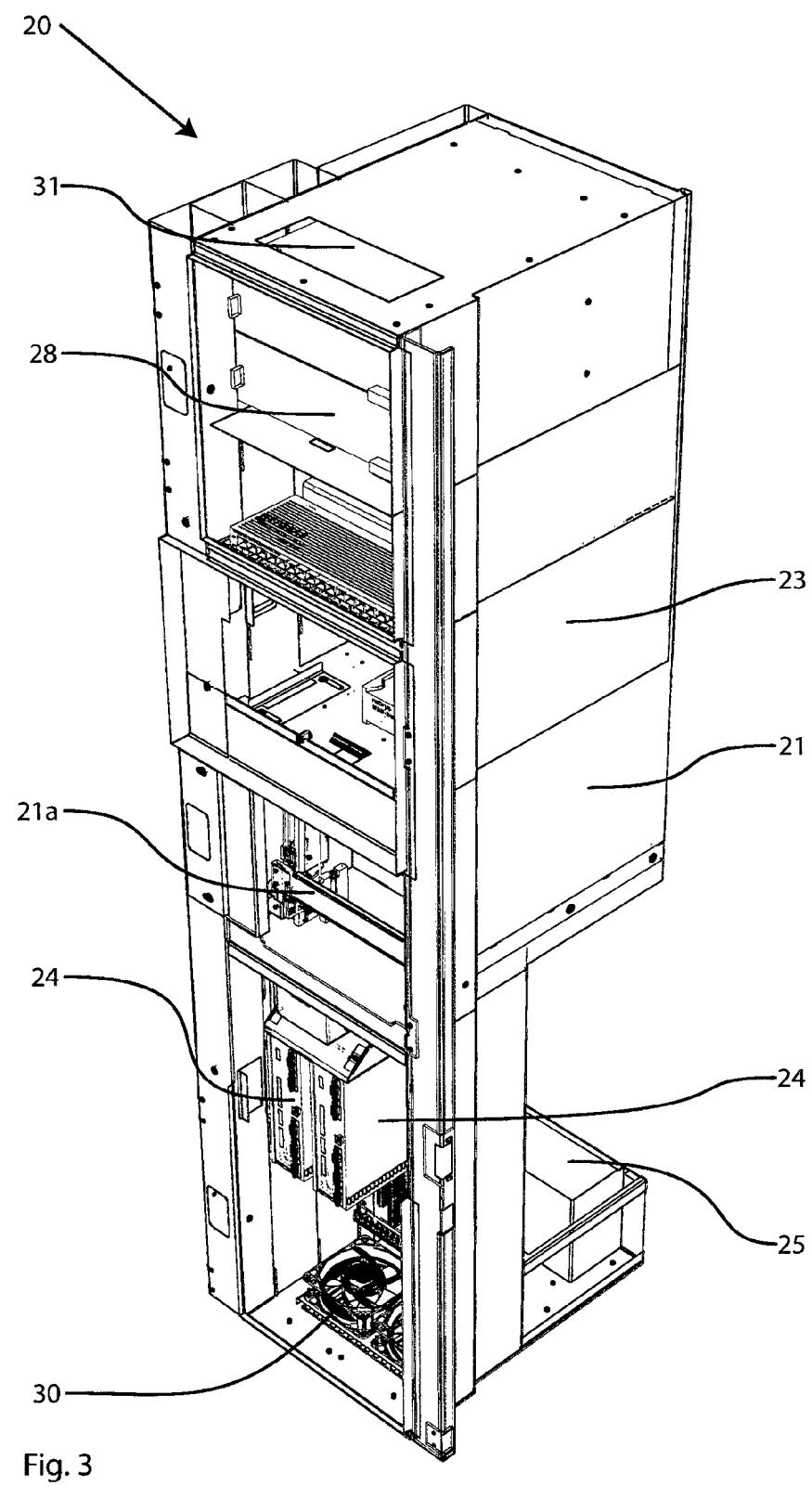

In the following, the present invention will be described with reference to the drawing, in which FIGS. 1A and 1B show schematic top views of a first and a second exemplary embodiment of the order picking apparatus according to the invention, FIG. 2 shows a schematic side view of a further exemplary embodiment of the order picking apparatus according to the invention, and FIG. 3 shows a detailed, slanted view of a supply and control module of a further exemplary embodiment of the order picking apparatus according to the invention.

FIG. 1A shows a schematic top view of a first exemplary embodiment of the order picking apparatus 1 according to the invention, having a housing 10 and a supply and control module 20. On an outer wall, the housing 10 comprises a housing coupling interface 15, and the supply and control module 20 also comprises a coupling interface 26 on an outer side. The supply and control module 20 is disposed at the housing coupling interface 15 of the housing 10, on the outer wall of the housing 10, specifically in such a manner that the module coupling interface 26 lies opposite the housing coupling interface 15, and thereby mechanical coupling between the housing 10 and the supply and control module 20 is made available.

The housing 10 comprises a conveying apparatus 14, which is introduced into the supply and control module 20 at the housing coupling interface 15, from the latter through the module coupling interface 26, and the section of the conveying apparatus 14 passed through the supply and control module 20 is part of the feed apparatus 21, not shown in any detail in this view. A plurality of shelf boards 11 is disposed in the housing 10, which boards form two parallel shelf rows. An alleyway is defined between the shelf rows, and a guide 16 for the operating device 12 and its gripping apparatus 13 is disposed in this alleyway. Furthermore, an electrical connection is made available between the housing 10 and the supply and control module 20, by way of the interface 27.

FIG. 1B shows a schematic top view of a second exemplary embodiment of the order picking apparatus 1 according to the invention. In this exemplary embodiment, as well, the order picking apparatus 1 comprises a housing 10. In contrast to the first exemplary embodiment shown in FIG. 1A, the housing 10 comprises a recess in which the supply and control module 20 is disposed. In this second exemplary embodiment, as well, the housing 10 comprises a conveying device 14, where a section of this conveying device 14 is passed into and through the supply and control module 20 by way of the housing coupling interface 15 and the module coupling interface 26. Furthermore, an electrical interface 27 is disposed adjacent to the coupling interfaces 15, 26. The housing 10 comprises a number of shelf boards 11 in this exemplary embodiment, as well, which form two shelf rows in the exemplary embodiment shown, which define an alleyway between them, in which a guide 16 for an operating device 12 having a gripping apparatus 13 is disposed. In the exemplary embodiment shown in FIG. 1B, the drive unit for the movement of the operating device along the guide 16 (x direction) is disposed within the supply and control module 20 and coupled with the operating device 12 in such a manner that the latter can be moved along the x direction. Corresponding coupling can take place using a belt drive, for example, where in such a case, corresponding deflection rolls must be provided in the housing or at the guide 16.

FIG. 2 shows a schematic side view of a further exemplary embodiment of the order picking apparatus 1. This comprises a housing 10 and a supply and control module 20. A plurality of shelf boards 11, disposed one on top of the other, are disposed in the housing 10, on which boards a plurality of medication packages 40 are or can be disposed. An operating device 12 can be moved in the x direction, on a guide 16. This operating device 12 comprises a gripping apparatus 13, which can be moved in the y direction. The drive unit for the movement of the operating device 12 in the x direction can be disposed at the foot of the operating device 12, for example, but also in the supply and control module 20; the precise placement of the drive unit depends on the spatial configuration of the order picking apparatus (see description of FIGS. 1A and 1B), Furthermore, a conveying apparatus 14 having an endless conveyor belt 14a is disposed in the housing 10, where in the exemplary embodiment shown, a section of the conveying apparatus 14 extends through the housing coupling interface 15 and the module coupling interface 26 into and through the feed apparatus 21 of the control and supply module 20. In the exemplary embodiment shown, the part of the conveying apparatus 14 that exits out of the housing 10 is part of the feed apparatus 21, so that transfer of the medication packages from a separate conveying apparatus in the supply and control module 20 onto a conveying apparatus of the housing is not required.

The module coupling interface 26 of the supply and control module 20 is disposed on an outer side or outer wall of the supply and control module, facing the housing, where the module itself is disposed in such manner, with regard to the housing 10, that mechanical coupling between the housing 10 and the supply and control module 20 is made available by way of the housing coupling interface 15 and the module coupling interface 26. Mechanical coupling is furthermore achieved by way of introducing the section of the conveying apparatus 14 into the feed apparatus 21 and passing it through.

Furthermore, an electrical connection exists between the housing 10 and the supply and control module 20, at the electrical interface 27. For one thing, the voltage supply of all the electrical assemblies within the housing takes place by way of this interface, and for another, control signals from the control electronics 24 are transmitted to the operating device 12, by way of a special interface or an interface section. As can be seen in FIG. 2, there are only two interfaces between the housing 10 and the supply and control module 20, namely a mechanical one and an electrical one; the work during installation or setup of the order picking apparatus is therefore restricted to one interface, with regard to coupling of electrical components, so that the setup time is clearly reduced.

In the exemplary embodiment shown, an identification and measurement apparatus 22 is disposed in the supply and control module 20, within the feed apparatus 21. In other exemplary embodiments, the identification and measurement apparatus can also be disposed outside of the feed apparatus 21. The universal supply and control module 20 furthermore comprises operator input/output devices 23 (a monitor having a touch screen) for input and reproduction of data and instructions by or to the operator. The control electronics 24, and, adjacent to them, the voltage supply assembly 25 are disposed in the lower section of the supply and control module 20. These two assemblies generate a major portion of the heat that occurs in the supply and control module 20, so that in the exemplary embodiment shown, an air intake device 30 is disposed under these assemblies, by way of which cool outside air is passed to the supply and control module 20. The air drawn in is passed through the module by way of air guides, not shown, and exits out of the supply and control module 20 in the upper region, at air exits 31. In this connection, the air guides are preferably configured in such a manner that no air enters into the housing 10, in order to minimize introduction of heat and dirt into the housing in this manner.

FIG. 3 shows a detailed slanted view of a supply and control module 20 of a further exemplary embodiment of the order picking apparatus according to the invention. The supply and control module 20 comprises an air intake 30 of a ventilation apparatus in the lower region. Furthermore, the voltage supply assembly 25 and the control electronics 24 are disposed in the lower region. The feed apparatus 21 is disposed above the control electronics 24. In the exemplary embodiment shown, this apparatus comprises a vertically movable barrier 21a that serves, among other things, to lay medication packages onto a conveying means (not shown) in a defined orientation. In the exemplary embodiment shown, the feed apparatus 21 does not comprise a conveying apparatus for the medication packages. This apparatus is made available, as is particularly described in FIG. 2, by the housing of the order picking apparatus, at the housing coupling interface of which a section of the conveying apparatus projects out of the housing, and during assembly of the order picking apparatus, is introduced into the feed apparatus, thereby causing the section of the conveying apparatus that projects out of the housing to become part of the feed apparatus 21. A region for operator input/output devices 23 is provided above the feed apparatus 21, where in the exemplary embodiment shown, these devices are not shown, for the sake of clarity. In this exemplary embodiment, a redundant uninterruptible power supply 28 is furthermore disposed in the upper region of the supply and control module 20. Finally, air exits 31 are disposed in the ceiling section of the supply and control module 20.

The invention claimed is:

1. A pharmacy order picking apparatus, comprising:
 a housing comprising:
  at least one operational device configured to access medication packages in a working region,
  a conveying apparatus that extends, at least in part, into the working region, and
  a housing coupling interface that is disposed on an outer wall or within a recess of the housing; and
 a universal supply and control module, external to the housing, the universal supply and control module comprising:
  a feed apparatus for the medication packages to be put in storage,
  control electronics configured to control one or more module assemblies disposed in the universal supply and control module,
  a mechanical module coupling interface mechanically coupled to the housing coupling interface to mechanically couple the universal supply and control module adjacent to the housing, so that medication packages to be put in storage are transferred to the conveying apparatus in or on the universal supply and control module, in a position known to the control electronics,
  a voltage supply assembly for all electrical assemblies of the universal supply and control module, and
  at least one electrical interface for coupling all electrical assemblies disposed within the housing to the voltage supply assembly of the universal supply and control module such that a voltage supply corresponding to each electrical assembly disposed within the housing is made available by the voltage supply assembly of the universal supply and control module,
  wherein the control electronics are configured to provide control signals to the at least one operational device via the at least one electrical interface.

2. The pharmacy order picking apparatus according to claim 1, wherein the housing comprises the recess, wherein the universal supply and control module is disposed within the recess, and wherein a front side of the universal supply and control module ends against a front side of the housing.

3. The pharmacy order picking apparatus according to claim 1, further comprising a plurality of shelf boards within the housing, wherein the at least one operational device can be moved horizontally and vertically in front of the shelf boards on a guide and includes a gripping apparatus for storing and/or retrieving medication packages on or from the shelf boards, wherein the plurality of shelf boards are disposed one on top of the other to form shelf rows, between which an alleyway is defined and in which the guide of the at least one operational device is disposed such that the at least one operational device can access the shelf boards of the shelf rows, using the gripping apparatus.

4. The pharmacy order picking apparatus according to claim 1, wherein a drive unit for movement of the at least one operational device along a guide within the housing is disposed in the universal supply and control module.

5. The pharmacy order picking apparatus according to claim 1, wherein a drive unit of the conveying apparatus is disposed in the universal supply and control module.

6. The pharmacy order picking apparatus according to claim 1, wherein a section of the conveying apparatus is guided out of the housing at the housing coupling interface and projects into the universal supply and control module by way of the module coupling interface.

7. The pharmacy order picking apparatus according to claim 1, wherein the conveying apparatus comprises an endless conveyor belt and wherein the universal supply and control module further comprises:
 an identification and measurement apparatus for identifying and measuring medication packages to be put in storage, and
 one or more operator input/output devices for input and reproduction of data and instructions by or to an operator.

8. The pharmacy order picking apparatus according to claim 1, wherein the universal supply and control module further comprises a ventilation apparatus having an air intake device, air guides, and air exits, and wherein the air guides are configured to inhibit air from entering into the housing.

9. The pharmacy order picking apparatus according to claim 1, wherein the at least one operational device includes a gripping apparatus configured to be rotatable about a vertical axis.

10. The pharmacy order picking apparatus according to claim 9, wherein the gripping apparatus is configured to be movable into a plurality of shelf boards disposed within the housing.

11. The pharmacy order picking apparatus according to claim 1, further comprising an additional conveying apparatus being provided in the universal supply and control module.

12. The pharmacy order picking apparatus according to claim 1, wherein the feed apparatus comprises a drawer system configured to receive medication packages.

13. An apparatus for picking pharmacy orders comprising:
a housing, comprising:
at least one operational device that can be moved horizontally and vertically, having a gripping apparatus for storing and/or retrieving medication packages, wherein the at least one operational device is configured to access medication packages situated in a working region,
a conveying apparatus for transporting medication packages to be stored, wherein the conveying apparatus extends, at least in part, into the working region of the at least one operational device, and
a housing coupling interface that is disposed on an outer wall or within a recess of the housing, and on which the conveying apparatus borders in a predetermined position; and
a universal supply and control module attached to an outer surface of the housing by the housing coupling interface.

14. The apparatus for picking pharmacy orders of claim 13, wherein the universal supply and control module comprises:
a feed apparatus for medication packages to be put in storage, and
an identification and measurement apparatus for identifying and measuring medication packages to be put in storage.

15. The apparatus for picking pharmacy orders of claim 13, wherein the universal supply and control module comprises:
an operator input/output device for input and reproduction of data and instructions by or to an operator,
control electronics that control one or more assemblies disposed in the universal supply and control module,
a voltage supply assembly for all electrical assemblies of the universal supply and control module,
a mechanical module coupling interface complementary to the housing coupling interface, and
at least one electrical interface for coupling all electrical assemblies disposed within the housing to the voltage supply assembly of the universal supply and control module, and
wherein the at least one electrical interface comprises an interface between the at least one operational device and the control electronics.

16. The apparatus for picking pharmacy orders of claim 15, wherein the universal supply and control module is disposed adjacent to the housing such that a mechanical coupling between the housing and the universal supply and control module is produced by way of the housing coupling interface and the module coupling interface, so that medication packages to be put in storage are transferred to the conveying apparatus in or on the universal supply and control module, in a position known to the control electronics.

17. A system for picking pharmacy orders comprising:
a housing having a housing coupling interface; and
a universal supply and control module comprising:
a feed apparatus for medication packages to be put in storage,
control electronics configured to control one or more assemblies disposed in the universal supply and control module,
a voltage supply assembly for all electrical assemblies of the universal supply and control module,
a mechanical module coupling interface complementary to the housing coupling interface and configured for mechanically attaching the universal supply and control module externally to the housing, and
at least one electrical interface for coupling all electrical assemblies disposed within the housing to the voltage supply assembly.

18. The system for picking pharmacy orders of claim 17 wherein the housing comprises:
a plurality of shelf boards disposed one on top of another, and
at least one operational device that can be moved horizontally and vertically in front of the shelf boards on a guide, having a gripping apparatus for storing and/or retrieving medication packages on or from the shelf boards,
wherein the at least one operational device is configured to access medication packages situated in a working region, and
wherein the at least one electrical interface comprises an interface for the at least one operational device, with which the control electronics are coupled such that the control electronics can transmit control signals to the at least one operational device.

19. The system for picking pharmacy orders of claim 18, wherein:
the housing comprises:
a conveying apparatus for transporting medication packages to be stored, wherein the conveying apparatus extends, at least in part, into the working region of the at least one operational device, and
wherein the housing coupling interface is disposed on an outer wall or within a recess of the housing, and wherein the conveying apparatus borders the housing coupling interface in a predetermined position and wherein the universal supply and control module is disposed adjacent to the housing such that a mechanical coupling between the housing and the universal supply and control module is produced by way of the housing coupling interface and the module coupling interface, so that medication packages to be put in storage are transferred to the conveying apparatus in or on the universal supply and control module, in a position known to the control electronics; and
the universal supply and control module further comprises:
an identification and measurement apparatus for identifying and measuring medication packages to be put in storage, and
operator input/output devices for input and reproduction of data and instructions by or to an operator.

20. The system for picking pharmacy orders of claim 17, wherein the housing comprises a recess, wherein the universal supply and control module is disposed within the recess, and wherein a front side of the universal supply and control module ends at a front of the housing.

* * * * *